United States Patent
Craig et al.

(10) Patent No.: US 7,114,878 B2
(45) Date of Patent: Oct. 3, 2006

(54) IRRIGATION GATE SYSTEM (75) Inventors: Kenneth R. Craig, Lethbridge (CA); Paul G. Elser, Lethbridge (CA); Lee Allen, Coaldale (CA); Peter Langeman, Coaldale (CA)

(73) Assignee: Aqua Systems 2000 Inc., Lethbridge (CA)

( * ) Notice: Subject to any disclaimer, the term of this patent is extended or adjusted under 35 U.S.C. 154(b) by 0 days.

(21) Appl. No.: 10/992,080

(22) Filed: Nov. 19, 2004

(65) Prior Publication Data

US 2005/0129463 A1    Jun. 16, 2005

Related U.S. Application Data (60) Provisional application No. 60/523,099, filed on Nov. 19, 2003.

(51) Int. Cl.
*E02B 7/40* (2006.01)
(52) U.S. Cl. .............. 405/99; 405/94; 405/87
(58) Field of Classification Search ........... 405/87–89, 405/92, 94, 99
See application file for complete search history.

(56) References Cited

U.S. PATENT DOCUMENTS

| | | | |
|---|---|---|---|
| 4,073,147 A * | 2/1978 | Nomura | 405/94 |
| 4,349,296 A | 9/1982 | Langeman | |
| 4,498,809 A * | 2/1985 | Farmer | 405/92 |
| 5,372,456 A | 12/1994 | Langeman | |
| 5,613,803 A * | 3/1997 | Parrish | 405/92 |
| 5,984,575 A * | 11/1999 | Knott, Sr. | 405/92 |
| 6,171,023 B1 * | 1/2001 | Townshend | 405/94 |
| 6,427,718 B1 | 8/2002 | Stringam et al. | |

* cited by examiner

*Primary Examiner*—Frederick L. Lagman
(74) *Attorney, Agent, or Firm*—Diederiks & Whitelaw, PLC (57) ABSTRACT

An irrigation gate system installed in a channel (such as a ditch or canal) for controlling the flow of water through the channel maintaining a desired level of water upstream from the irrigation gate system or for controlling water flow downstream from the irrigation gate system. The irrigation gate system includes a gate which is maintained in a closed position for preventing water flow past the gate or alternatively, in one of a plurality of open positions for allowing desired amounts of water in the channel to flow past the gate. The gate is vertically hingedly connected to a pipe shaft supported by a frame installed in the channel. A gate actuator moves the gate between its various positions upon receiving signals from an electronic programmable controller which in turn may receive signals from a variety of sources.

28 Claims, 6 Drawing Sheets

IRRIGATION GATE SYSTEM

CROSS-REFERENCE TO RELATED APPLICATIONS

This application claims the benefit of Canadian Patent Application No. 2,450,151, filed Nov. 19, 2003, and U.S. Patent Application No. 60/523,099, each of which is incorporated herein by reference in its entirety.

FIELD OF THE INVENTION

The present invention relates generally to irrigation gates. More particularly, the present invention relates to a cost-effective, reliable water gate system for controlling water in irrigation supply canals and similar water channels through the use of an electronically controlled gate or gates.

BACKGROUND OF THE INVENTION

Prior art devices have been developed to control water in irrigation supply canals and in similar water channels. Such devices are required to manage water resources effectively.

An example of such a prior art device used to maintain a constant or predetermined water level in an irrigation ditch gate as found in U.S. Pat. No. 4,349,296 (referred to as the LOPAC patent). The gate system taught in the LOPAC patent consists of two opposing, vertically hinged biased gate leaves which automatically open and close in response to a change in water pressure against the upstream surface of the gate leaves, thereby maintaining a constant upstream water level in the irrigation ditch.

One disadvantage of the system presented in the LOPAC patent is that it is difficult and time consuming to-fine-tune and place the springs necessary to bias the gate leaves to a desired position. This disadvantage is especially pronounced when the gate leaves need to be larger than one square meter to span an irrigation ditch.

A further disadvantage of the system disclosed in the LOPAC patent is that since the gate leaves are spring-actuated, the system is limited to controlling the upstream water level and does not, for example, respond to downstream conditions.

It is, therefore, desirable to provide an irrigation gate system which does not require a great detail of fine tuning to achieve the desired flow through the irrigation gate system and is capable of responding to and being used to control more than upstream water levels.

SUMMARY OF THE INVENTION

It is an object of the present invention to obviate or mitigate the disadvantages of the prior art by providing an irrigation gate system which can be easily and quickly adjusted electronically to achieve a desired flow through an irrigation gate system. It is a further object of the present invention to control upstream water levels and respond to other conditions (such as downstream flow) allowing for further uses of the present invention.

In a first aspect, the present invention provides an irrigation gate system installed in a ditch or canal for maintaining a desired level of water upstream from the irrigation gate system. The irrigation gate system includes a gate, which is operable in either a closed position for preventing water from flowing past the gate or in a plurality of open positions for allowing variable amounts of water to flow past the gate. The gate is vertically hingedly connected to a pipe shaft, which is supported by a frame installed in the ditch or canal. A gate actuator in cooperation with the pipe shaft moves the gate between its various positions upon receiving signals from an electronic programmable controller which in turn receives signals from a level sensor (or other sensor depending on what is being monitored) which may be installed upstream from the gate to maintain a desired upstream water level or downstream if something other than the desired upstream water level is being measured). Additionally, the gate may be set at a particular open position to measure the volume or rate of flow in the ditch or channel by reference to the water's height in the gate at that pre-set position.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein.

DETAILED DESCRIPTION

Generally, the present invention provides a method and system for providing an irrigation gate system, which can be easily and quickly electronically adjusted to achieve desired water levels upstream from the gate through the irrigation gate system, or to achieve other desire water flow or water level results based upon readings provided by a sensor or sensors.

Figure 1:
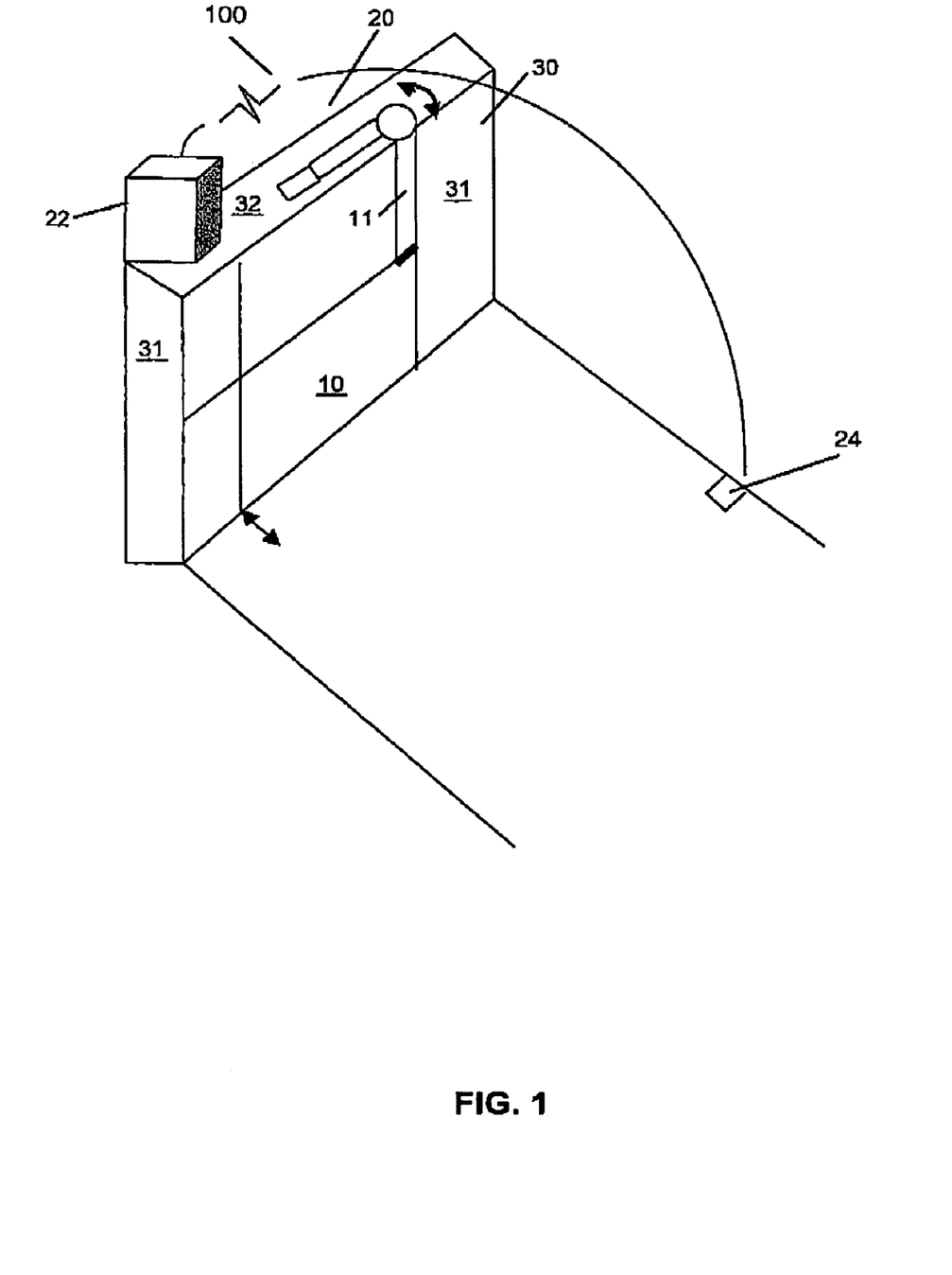
FIG. 1 is a perspective view of a gate in a closed position in accordance with the present invention.

As shown in FIG. 1, the preferred embodiment of the present system 100 generally includes a frame 30, which is positioned within an irrigation ditch, channel, weir or other check structure. The frame 30 includes two sidewalls 31, which support a top wall 32. Sidewalls 31 include a pipe shaft 11, which is operatively connected to and forms a vertical hinge for gate 10 for allowing the gate 10 to pivot between a closed position and a plurality of open positions. If gate 10 is closed, flow through the ditch or channel is restricted or stopped. If gate 10 is open, flow is allowed through the ditch or channel and such flow depends on the relative openness of gate 10. Accordingly, flow through the ditch or channel (and therefore the upstream water level) is changed by opening or closing the gate 10 and, if opened, flow is adjusted by opening the gate 10 more or less.

Figure 2:
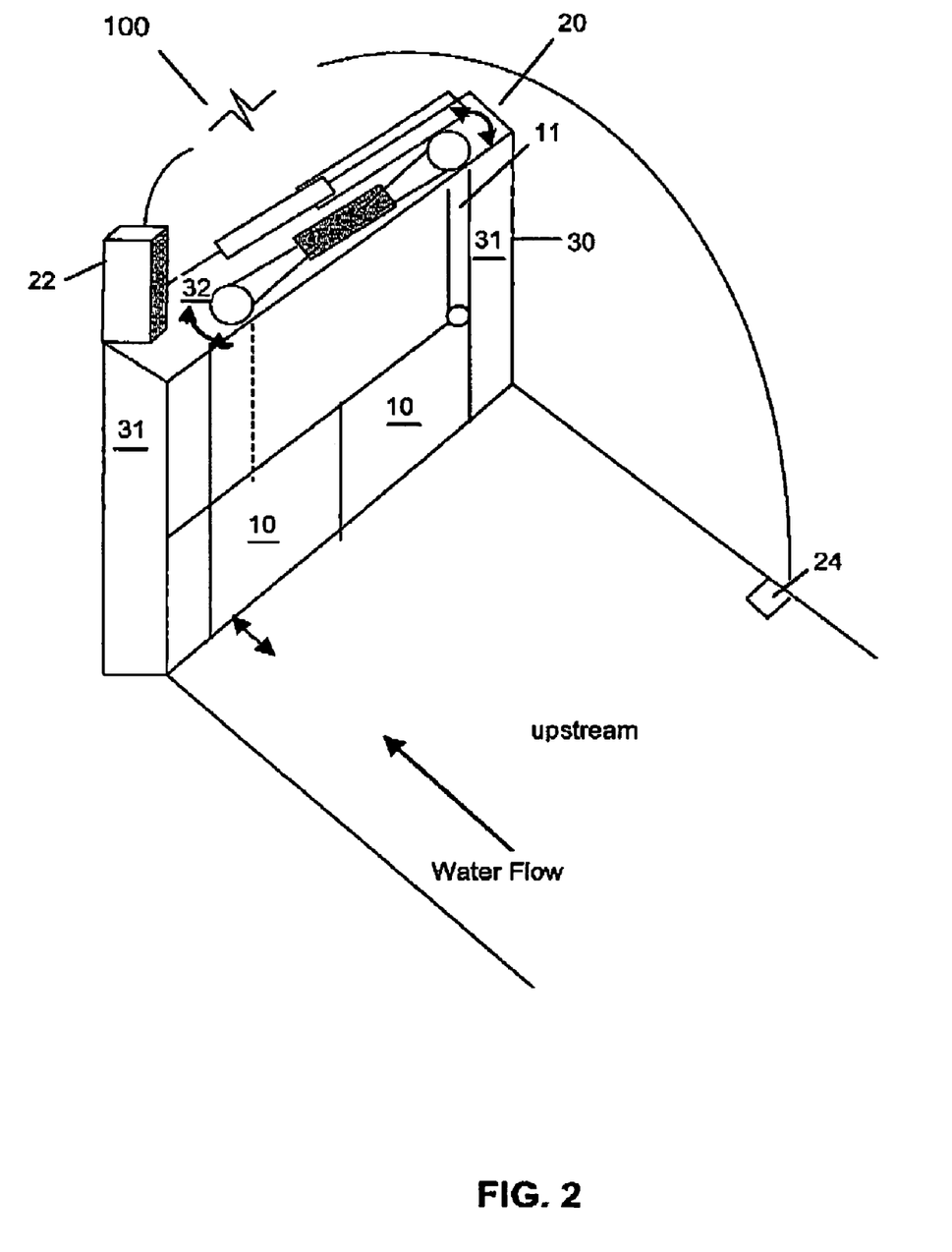
FIG. 2 is a perspective view of a plurality of gates each in a closed position in accordance with the present invention.
Figure 3:
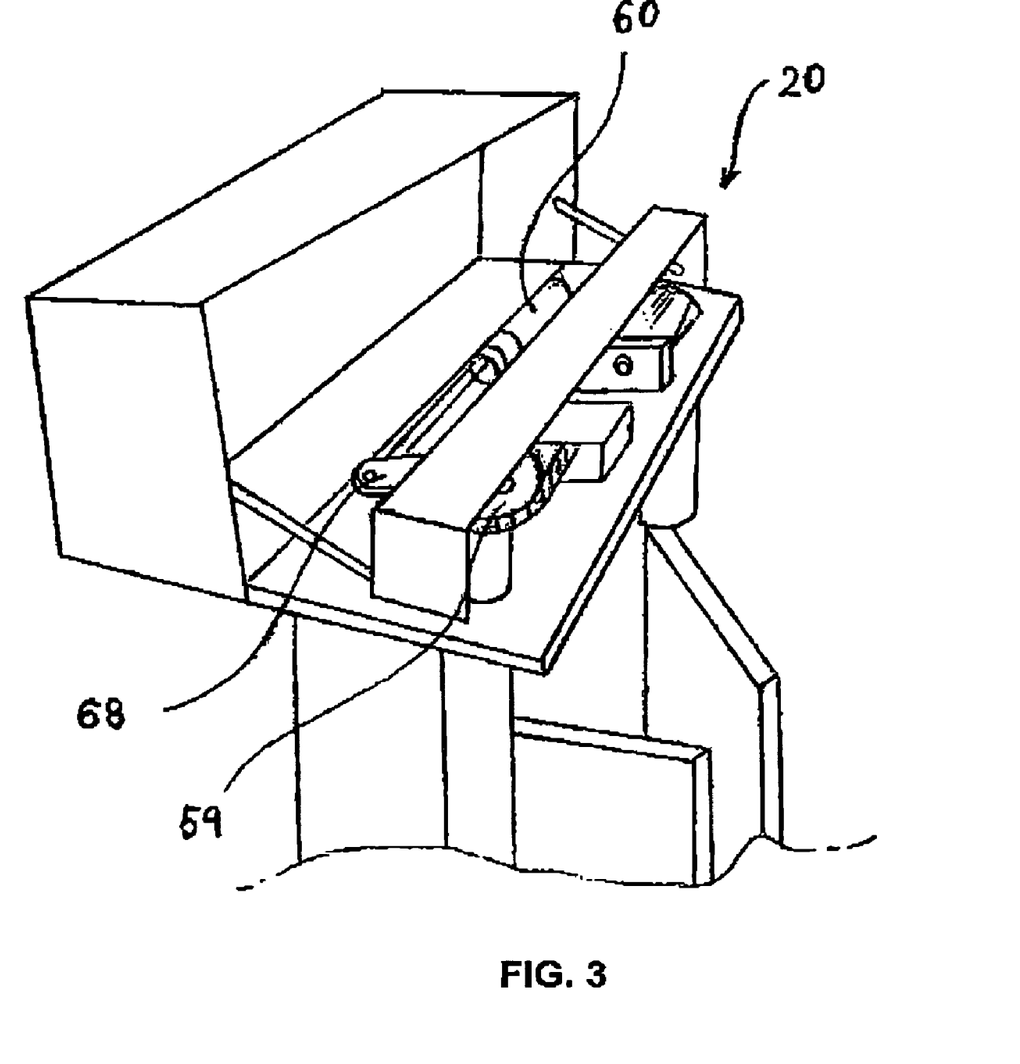
FIG. 3 is a perspective view of a gate activator in accordance with the present invention.
Figure 4:
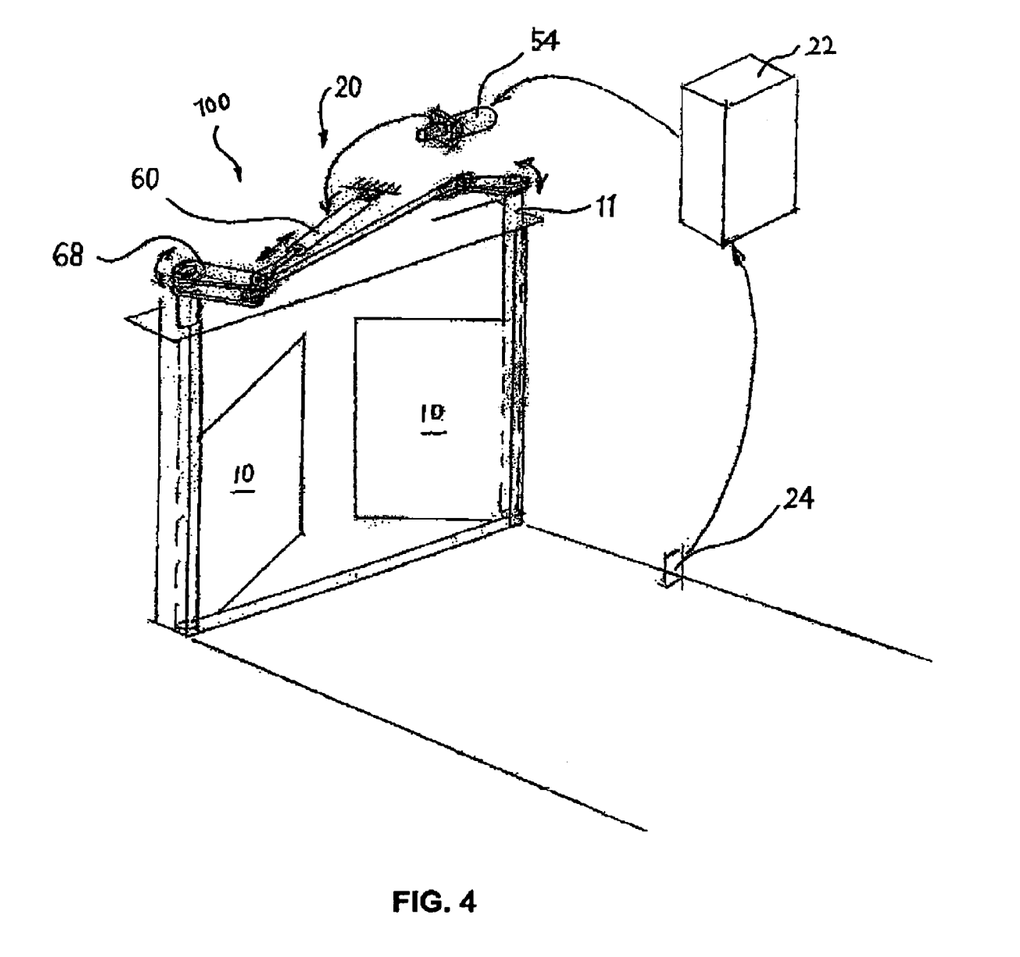
FIG. 4 is a perspective and exploded view of a plurality of gates in an open position in accordance with the present invention.
Figure 5:
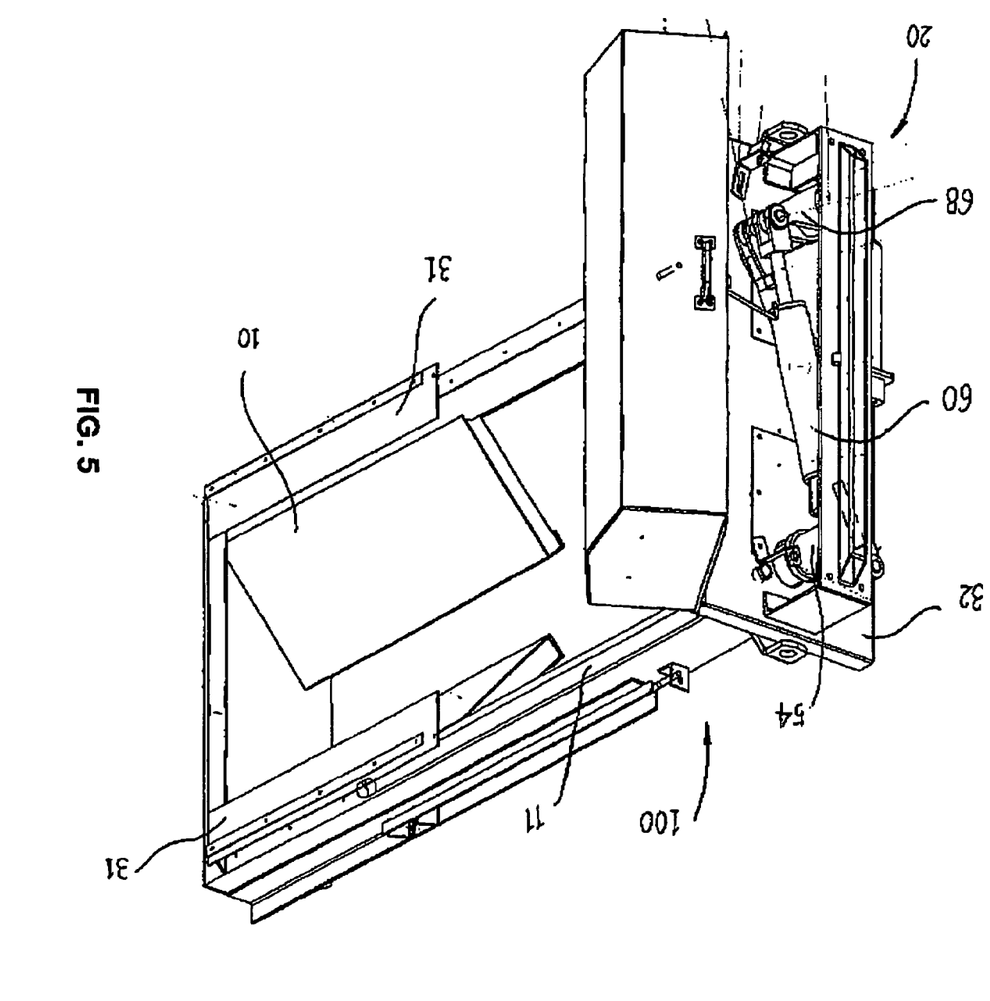
FIG. 5 is a perspective view of an alternate gate actuator in operation with a plurality of gates in accordance with the present invention.

The top wall 32 defines a recess for receiving pipe shaft 11. As shown in FIG. 2, a gate actuator 20 on the top wall 32 is connected to pipe shaft 11 for rotating pipe shaft 11 and consequently rotating gate 10 between various positions. Gate actuator 20 may be a screw jack, a hydraulic cylinder or another suitable externally-powered mechanism (samples of which are shown in FIGS. 3, 4 and 5) which is in communication with a programmable controller 22. Gate actuator 20 translates electronic signals received from controller 22 into the mechanical movement of gate 10. In one embodiment best shown in FIG. 3, gate activator 20 includes a lever arm 68 operatively connected to a synchronizing roller chain 59, which in turn is connected to a hydraulic cylinder 60, and limit switch harness (not shown) which collectively act as a drive train. A hydraulic pump 54 may be used in this embodiment to provide hydraulic power to the cylinder 60. In an alternate embodiment shown in FIG. 4, gate actuator 20 is a direct mechanical cylinder drive which may be used with a one-gate 10 embodiment or may, optionally, operate two gates. Any of the gate actuator 20 systems may be driven by a fractional horsepower motor (not shown).

Controller 22 provides signals to gate actuator 20 to determine the appropriate position of the gate 10. Controller 22 includes a receiver or transceiver (not shown) and may, accordingly, receive signals from a number of sources including a level sensor 24 which may be placed upstream from gate 10 to determine the water level. Alternatively, controller 22 may be electrically connected to level sensor 24 thereby alleviating the need for controller 22 to have a receiver or transceiver. When the water level changes, level sensor 24, which includes a transmitter or transceiver (not shown) or which may not include a transmitter or transceiver if electronically connected to controller 22, but which in any event transmits a signal to controller 22. Controller 22 then compares the information contained in the signal with pre-programmed information in controller 22 (namely, the desired water level) and determines if water flow should increase or decrease to achieve the desired result. If more flow is required, controller 22 sends a signal which then turns on the pump 54 to close gate 10 or opens a relief valve on the pump 54 to open gate 10 (upstream water pressure being the driving force to open gate 10). Level sensor 24 may be placed to measure water levels either above or below gate 10, depending upon the operator's designs.

As an alternative to the level sensor 24 for providing signals to the controller 22, a flow meter (not shown) may be installed downstream from gate 10 for measuring flow which can provide signals to controller 22. In a further alternative or in addition to the other sensors, an emergency high level probe (not shown) may provide an emergency high level override signal to controller 22 which would in turn cause gate 10 to open completely in the event of an undesirably high water level occurring. Once the water level returns to an acceptable level another signal may be sent to reset controller 22. Still further, other sensors may provide controller 22 with signals to open or close gate 10 based on pre-defined algorithms programmed into controller 22. In yet another embodiment, an operator may remotely transmit signals to controller 22 to control gate 10 (rather than having the gate's operation automatically controlled based on algorithms pre-programmed in controller 22 and signals provided from various sensors). A worker skilled in the art will appreciate that a number of sensors may be in communication with the controller 22 to allow the algorithms pre-programmed in controller 22 to react to a variety of inputs from multiple sensors.

Pipe shaft 11 may also be operated using a hand crank (not shown) connected to pipe shaft 11 to provide for manual operation of gate 10 for emergencies or to perform maintenance or to reset the present system.

In any of the above embodiments, power to any element requiring power, such as a fractional horsepower motor, level sensor 24 and controller 22 may be provided by connection to a deep cycle battery operatively connected to a solar panel or battery charger.

A worker skilled in the art will appreciate that the present invention can be applied in a variety of circumstances, including in irrigation check structures, spillway structures and diversion structures. Gate 10 may be constructed of various sizes to fit the dimensions of these various environments.

Figure 6:
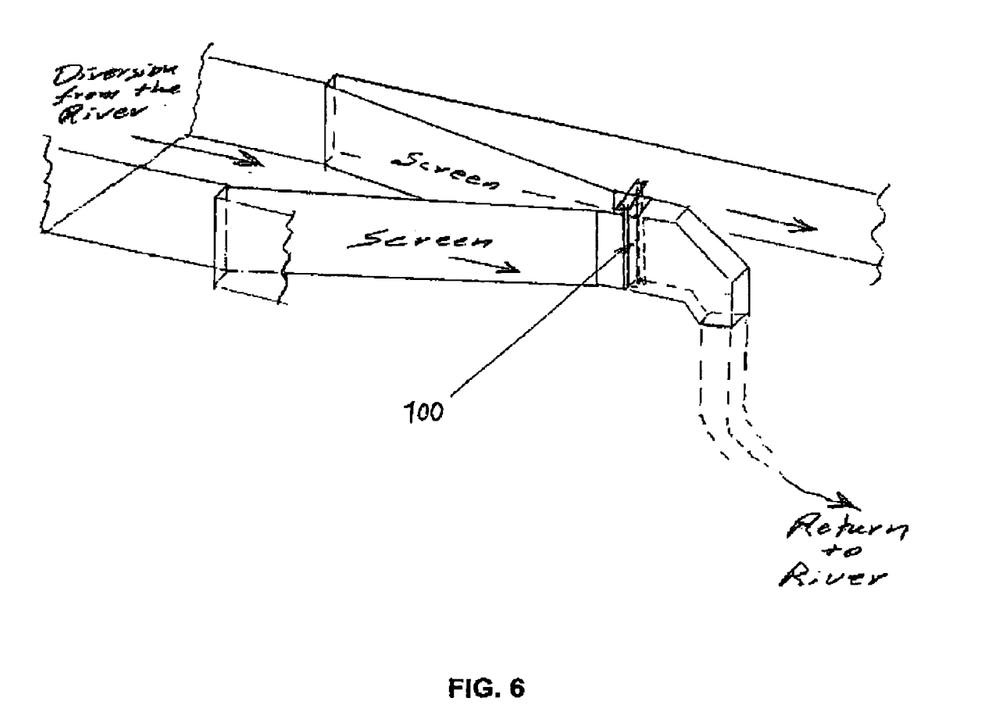
FIG. 6 is a perspective view of an irrigation gate system used as part of a fish exclusion structure in accordance with the present invention.

The present invention may also be used for fish and other screening structures one example of which is as shown in FIG. 6. In particular, structures are sometimes used to screen fish out of a diversion. Theses structures are typically long screen structures which allow flow back to the main stream at the downstream end of the stream (typically requiring at least 10% of the water flowed through the screen structure to be returned to the main stream). The gate 10 can be used to control the volume of water flow back to the main stream while allowing fish to pass through the gate 10.

While the embodiments of the present invention described above include a single gate 10, it will be readily apparent to a worker skilled in the art that a plurality of gates 10 and corresponding shafts 11 and gate actuators 20 (but not necessarily a plurality of controllers) would also provide operative embodiments of the present invention.

In a two-gate embodiment the irrigation gate system 100 may be used to calculate the flow rate of water past the gate 10, owing to the system's precise settings. That is, the irrigation gate system 100 may serve essentially as a weir except that water does not flow over the weir until the gates 10 are opened. When the gates 10 are opened the water flowing over the weir is restricted by the gates 10 and the frame 30 and gates 10 function partly as an orifice of discernible dimensions. There are formulae and tables known by those skilled in the art for determining the rate of flow through most weirs and orifices which can be used to calculate rate of flow (although as the irrigation gate system 100 is not definable as exactly a weir or as an orifice the irrigation gate system 100 requires calibration). The width of the gate 10 opening may be calculated by multiplying the weir width by the angle on the gates 10. Width and depth of flow can then be used in a weir formula to calculate the approximate flow rate of water. An empirical coefficient is needed to make the flow calculation accurate. The coefficient is determined by setting up a gate 10 in a controlled situation and passing varied metered flows through the gate 10. Graphs or charts can then be produced showing flows for various gate openings and depths of flow. Flows may be correlated for various-sized gates 10, and various opening configurations (gate positions).

A worker skilled in the art will appreciate that gate 10 and frame 30 could be made of a variety of materials which have high durability in an aquatic environment. In one embodiment, gate 10 and frame 30 are constructed of mild steel with a two-part epoxy coating. In another embodiment, gate 10 and frame 30 are constructed of stainless steel, although due to the higher cost of this material, this embodiment is typically used only in severe conditions.

A worker skilled in the art will appreciate that controller 22, to perform its function, includes a circuit board (not shown) and memory (not shown), and programmable computing capabilities.

The above-described embodiments of the present invention are intended to be examples only. Alterations, modifications and variations may be effected to the particular embodiments by those of skill in the art without departing from the scope of the invention, which is defined solely by the claims appended hereto.

What is claimed is:

1. An irrigation gate system for controlling the flow of water in a water canal comprising:
   a. at least two opposed rotateable gates positioned in the water canal, the gates for moving between a closed position preventing water upstream of the gates from flowing past the gates and a plurality of open positions to allow variable amounts of water to flow past the gates;
   b. a gate actuator for rotating both gates between positions;
   c. a controller in communication with the gate actuator for providing signals to direct the gate actuator to rotate the gates between positions;
   d. a sensor in communication with the controller for providing the sensor's readings to the controller; and
   e. the controller calculating the difference between the readings provided by the sensor and a pre-programmed condition stored in the memory of the controller and providing signals to the gate actuator based on the difference between the readings and the pre-programmed condition.

2. An irrigation gate system as in claim 1 wherein the pre-programmed condition stored in the memory of the controller is a desired water level upstream from the gates and the sensor provides readings on the water canal's current water level upstream from the gates.

3. An irrigation gate system as in claim 1 wherein the pre-programmed condition stored in the memory of the controller is a desired rate of water flow downstream from the gates and the sensor is a flow meter which provides readings on the water canal's current rate of water flow downstream from the gates.

4. An irrigation gate system as in claim 1 wherein the pre-programmed condition stored in the memory of the controller is an emergency water level upstream from the gates and the sensor is an emergency high level probe which provides readings on the water canals current water level upstream from the gates.

5. An irrigation gate system as in claim 1 wherein the pre-programmed condition stored in the memory of the controller is based on an algorithm which considers the readings provided by the sensor and at least one additional sensor about the water canal's current conditions.

6. An irrigation gate system as in claim 1 wherein the gate actuator includes a drive train and is powered by a battery.

7. An irrigation gate system as in claim 1 wherein the gate actuator includes a direct mechanical cylinder drive and is powered by a battery.

8. An irrigation gate system as claim 1 wherein the gates are comprised of mild steel with an epoxy to prevent the gate from corroding.

9. An irrigation gate system as in claim 1 wherein the gates are comprised of stainless steel to prevent the gate from corroding.

10. An irrigation gate system as in claim 1 wherein the gates and the frame are comprised of mild steel with an epoxy to prevent the gate and the frame from corroding.

11. An irrigation gate system as in claim 1 wherein the gates and the frame are comprised of stainless steel to prevent the gate and the frame from corroding.

12. A method for maintaining a desired level of water upstream from the irrigation gate system comprising the steps of:
   a. installing the device in claim 1 in a canal; and
   b. operating the device in claim 1.

13. A method for controlling water flow in an irrigation check structure comprising the steps of:
   a. installing the device in claim 1 in a canal; and
   b. operating the device in claim 1.

14. A method for controlling water flow in a spillway structure comprising the steps of:
   g. installing the device in claim 1 in a channel feeding the spillway; and
   h. operating the device in claim 1.

15. A method for controlling water flow in a diversion structure comprising the steps of:
   a. installing the device in claim 1 in a channel controlling water leaving the diversion structure; and
   b. operating the device in claim 1.

16. A method for controlling water flow in a in a fish screening structure comprising the steps of:
   a. installing the device in claim 1 in a channel controlling water leaving the fish screening structure; and
   b. operating the device in claim 1.

17. A method of using the device in claim 1 to calculate through-gate flow rates by setting the gates to a known partially-opened position, measuring the depth of the water at a point on at least one of the gates' surface, and inferring from that height and a calculated equivalent orifice to the partially-opened gate's opening at the point of measurement, the rate of flow over the gates' lower edge through the partially-opened opening between the gates and the frame; the calculation of the equivalent orifice being done by physical measurement and adjusted by empirically recording the height at known flow-rates.

18. An irrigation gate system installed in a water canal for controlling the flow of water in the canal comprising:
   a. at least two opposed rotateable pipe shafts positioned near the water canal;
   b. a gate hingedly connected to each pipe shaft, the gates for moving between a closed position for preventing water upstream of the gates from flowing past the gates and a plurality of open positions to allow variable amounts of water to flow past the gates;
   c. a gate actuator for rotating both pipe shafts thereby rotating the gates between positions;
   d. a controller in communication with the gate actuator for providing signals to direct the gate actuator to rotate the gates between positions by rotating the pipe shafts;
   e. a sensor in communication with the controller for providing the sensor's readings to the controller; and
   f. the controller calculating the difference between the readings provided by the sensor and a pre-programmed condition stored in the memory of the controller and providing signals to the gate actuator based on the difference between the sensor readings and the pre-programmed condition.

19. An irrigation gate system as in claim 18 wherein the pipe shafts may be manually opened by an operator to maintain the gates or to reset the gates' position.

20. An irrigation gate system as in claim 18 wherein the pre-programmed condition stored in the memory of the controller is a desired water level upstream from the gates and the sensor provides readings on the water canal's current water level upstream from the gates.

21. An irrigation gate system as in claim 18 wherein the pre-programmed condition stored in the memory of the controller is a desired rate of water flow downstream from the gates and the sensor is a flow meter which provides readings on the water canal's current rate of water flow downstream from the gates.

22. An irrigation gate system as in claim 18 wherein the pre-programmed condition stored in the memory of the controller is an emergency water level upstream from the gates and the sensor is an emergency high level probe which provides readings on the water canals current water level upstream from the gates.

23. An irrigation gate system as in claim 18 wherein the pre-programmed condition stored in the memory of the controller is based on an algorithm which considers the readings provided by the sensor and at least one additional sensor about the water canal's current conditions.

24. An irrigation gate system for controlling the flow of water in a water canal comprising:
   a. at least two opposed rotateable gates positioned in the water canal, the gates for moving between a closed position preventing water upstream of the gates from flowing past the gates and a plurality of open positions to allow variable amounts of water to flow past the gates;
   b. a gate actuator for rotating both gates between positions;
   c. a controller in communication with the gate actuator for providing signals to direct the gate actuator to rotate the gates between positions;
   d. a transmitter in communication with the controller for providing signals to the controller; and
   e. the controller for providing signals to the gate actuator based on the signals received from the transmitter.

25. An irrigation gate system for controlling the flow of water in a water canal comprising:
   a. at least two opposed rotateable gates positioned in the water canal, the gates for moving between a closed position preventing water upstream of the gates from flowing past the gates and a plurality of open positions to allow variable amounts of water to flow past the gates;
   b. a gate actuator for rotating each gate;
   c. a controller in communication with the gate actuator for providing signals to direct the gate actuator to rotate the gates between positions;
   d. a sensor in communication with the controller for providing the sensor's readings to the controller; and
   e. the controller calculating the difference between the readings provided by the sensor and a pre-programmed condition stored in the memory of the controller and providing signals to the gate actuator based on the difference between the readings and the pre-programmed condition.

26. An irrigation gate system for controlling the flow of water in a water canal comprising:
   a. a frame having two side walls on either side of the canal for supporting a top wall, one side wall having a pipe shaft received through the top wall;
   b. a gate connected to the pipe shaft for moving between a dosed position for preventing water from flowing past the gate and a plurality of open positions for allowing variable amounts of water to flow past the gate;
   c. a gate actuator for rotating the pipe shaft thereby rotating the gate between its plurality of positions;
   d. a controller in communication with the gate actuator for providing signals to direct the gate actuator to rotate the gate between positions;
   e. a sensor in communication with the controller for providing the sensor's readings to the controller; and
   f. the controller calculating the difference between the readings provided by the sensor and a pre-programmed condition stored in the memory of the controller and providing signals to the gate actuator based on the difference between the readings and the pre-programmed condition.

27. An irrigation gate system for maintaining a desired level of water flow rate in a water canal comprising:
   a. a frame having two side walls on either side of the canal for supporting a top wall, one side wall having a pipe shaft received through the top wall;
   b. a gate hingedly connected to the pipe shaft for moving between a closed position for preventing water from flowing past the gate and a plurality of open positions for allowing variable amounts of water to flow past the gate;
   c. a gate actuator for rotating the pipe shaft thereby rotating the gate between its plurality of positions;
   d. a controller in communication with the gate actuator for providing signals to direct the gate actuator to rotate the gate between positions;
   e. a sensor in communication with the controller, the sensor having a flow meter downstream from the gate in communication with the controller for indicating the current rate of water flow downstream from the gate to the controller; and
   f. the controller calculating the difference between the readings provided by the flow meter and a pre-programmed desired downstream water flow rate stored in the memory of the controller and providing signals to the gate actuator to open or close the gate, as required, to reduce the difference between the readings and the desired downstream water flow rate.

28. An irrigation gate system for controlling the flow of water in a water canal comprising:
   a. a frame having two side walls on either side of the canal for supporting a top wall, one side wall having a pipe shaft received through the top wall;
   b. a gate connected to the pipe shaft for moving between a closed position for preventing water from flowing past the gate and a plurality of open positions for allowing variable amounts of water to flow past the gate;
   c. a gate actuator for rotating the pipe shaft connected to lever arms operated by hydraulic cylinder thereby rotating the gate between its plurality of positions;
   d. a controller in communication with the gate actuator for providing signals to direct the gate actuator to rotate the gate between positions;
   e. a sensor in communication with the controller for providing the sensor's readings to the controller; and
   f. the controller calculating the difference between the readings provided by the sensor and a pm-programmed condition stored In the memory of the controller and providing signals to the gate actuator based on the difference between the readings and the pre-programmed condition.

* * * * *